United States Patent [19]
Resta

[11] Patent Number: 6,021,725
[45] Date of Patent: Feb. 8, 2000

[54] APPARATUS FOR TEMPORARILY STORING PRODUCTS, PARTICULARLY AT THE EXIT OF A QUILTING MACHINE

[75] Inventor: Roberto Resta, Faenza, Italy

[73] Assignee: Resta S.r.l., Faenza, Italy

[21] Appl. No.: 08/867,972

[22] Filed: Jun. 3, 1997

[30] Foreign Application Priority Data

Jun. 11, 1996 [IT] Italy ................................. BO96A0314

[51] Int. Cl.⁷ ........................... D05B 11/00; B65G 47/36
[52] U.S. Cl. ......................... 112/117; 112/311; 198/465.4
[58] Field of Search .................... 112/117, 303, 112/304, 311, 470.36, 470.05, 470.28; 38/143, 7; 198/465.4, 687.1

[56] References Cited

U.S. PATENT DOCUMENTS

| | | |
|---|---|---|
| 3,592,141 | 7/1971 | Davidson . |
| 4,736,687 | 4/1988 | Grube et al. .......................... 198/465.4 |
| 4,774,505 | 9/1988 | Ueda et al. ............................... 38/143 |
| 4,979,860 | 12/1990 | Ueda et al. ............................ 198/465.4 |
| 5,168,645 | 12/1992 | Robin et al. ............................... 38/143 |
| 5,169,282 | 12/1992 | Ueda et al. .................................. 37/7 |

FOREIGN PATENT DOCUMENTS 2 142 980   2/1973   France .
89 11807   12/1989   WIPO .

Primary Examiner—John J. Calvert
Assistant Examiner—Tejash D Patel
Attorney, Agent, or Firm—Guido Modiano; Albert Josif

[57] ABSTRACT

An apparatus for temporarily storing products at the exit of a quilting machine comprising an inclined guiding element along which at least one carriage, provided with an element for gripping the product manufactured by the quilting machine, can slide by gravity, a first and a second stop elements for the carriage being arranged along the guiding element, and actuation elements, which act on the grip element to release the removed product, being associated with the stop elements. The carriage released by the second stop element is transferred onto a vertical lifting unit, which is provided with retention and release elements for retaining the carriage at the lower stroke limit and releasing it at the upper stroke limit to insert the carriage on the guiding element.

6 Claims, 4 Drawing Sheets

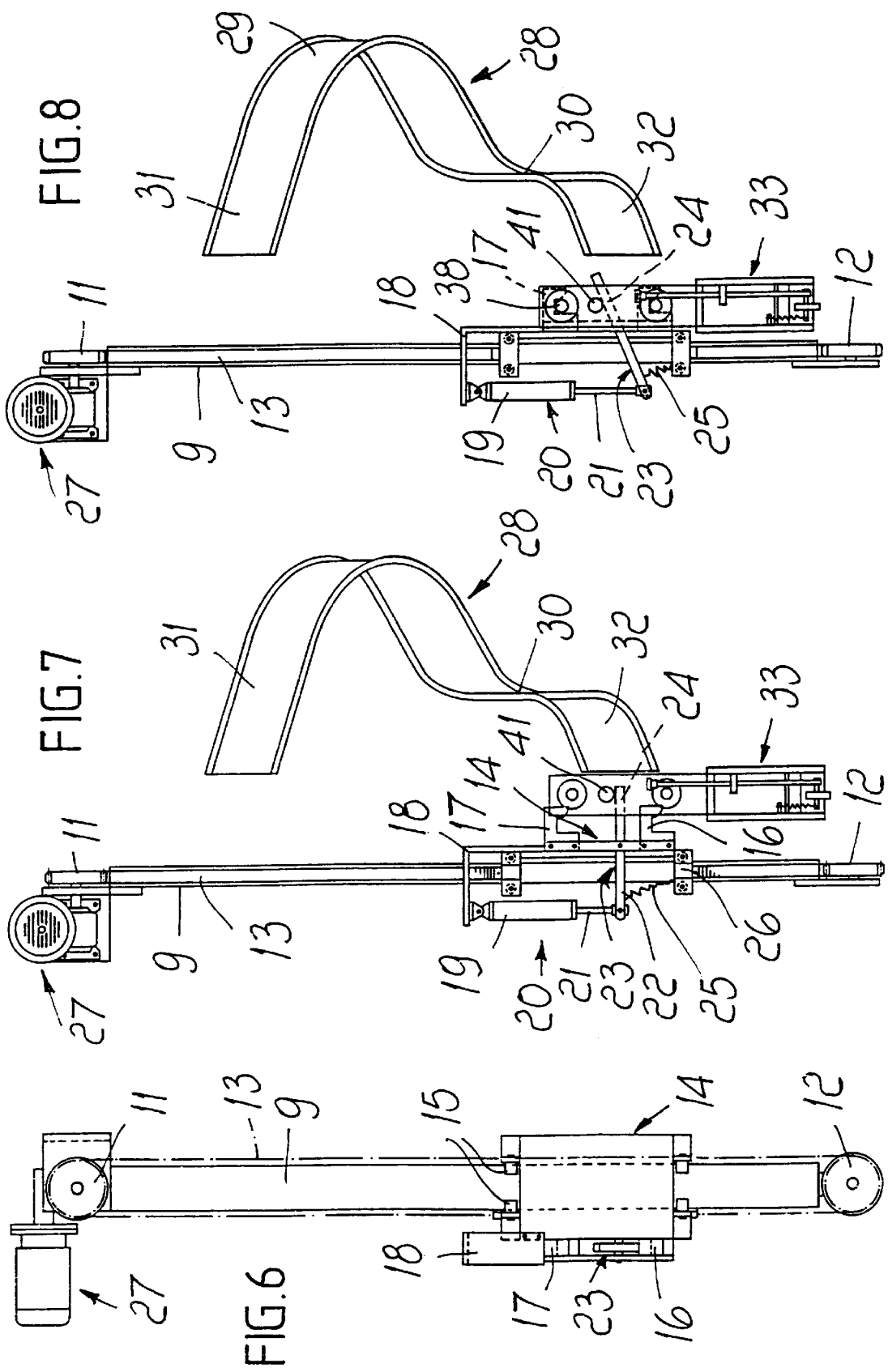

6,021,725

APPARATUS FOR TEMPORARILY STORING PRODUCTS, PARTICULARLY AT THE EXIT OF A QUILTING MACHINE

BACKGROUND OF THE INVENTION

The present invention relates to an apparatus for temporarily storing products, particularly at the exit of a quilting machine.

In conventional quilting machines the product to be quilted (for example a padded cloth) is laid on a horizontal frame above which the quilting machine that performs the intended stitches moves along preset paths.

When the operations for quilting the product have ended, the clamps holding the product along its perimeter are opened and the product rests on an underlying surface, wherefrom it is removed by means of an adapted extractor. In practice, said extractor is constituted by a clamp mounted on a carriage which can move horizontally, so as to transfer the product onto an adjacent receiving surface for completing the finishing operations.

In these devices, the quilting machine often completes the quilting of one product before the previously completed product has been removed from the receiving surface whereonto it has been transferred. This forces to stop the quilting machine until the receiving surface is free.

SUMMARY OF THE INVENTION

A principal aim of the present invention is to provide an apparatus which allows to obviate the shortcomings of the known art, particularly by allowing to temporarily store the products delivered by the quilting machine until the receiving surface is free, allowing to subsequently remove them when required.

Within the scope of this aim, an object of the present invention is to provide an apparatus which is structurally simple and can be associated with any quilting machine.

This aim and this object are achieved by an apparatus for temporarily storing products, particularly at the exit of a quilting machine, characterized in that it comprises a guiding element lying along an inclined path, at least one carriage which is provided with a grip element for gripping the product being manufactured in the quilting machine and can slide by gravity along said guiding element, a first and a second stop elements for said carriage being arranged along said guiding element, with said first stop element being arranged at an upper portion of the guiding element and with said second stop element being located at a lower portion of the guiding element along which the carriages released by said first stop element can accumulate, said first stop element being associated with release actuation means for actuating the grip element in the position for releasing the removed products and with a lifting unit associated with said guiding element and provided with means for retaining and releasing said carriage, said lifting unit being actuated downwards from an intermediate position, whereat said retention and release means receive the carriage from said lower portion, towards a lower position lying below said intermediate position, whereat said grip element removes a product from said quilting machine, and being then actuated with an upward motion from said lower position to an upper position lying above said intermediate position, whereat said retention and release means release said carriage on said upper portion, and being then actuated with a downward motion to said intermediate position in order to receive a new carriage released by said second stop element.

BRIEF DESCRIPTION OF THE DRAWINGS

Further characteristics and advantages of the present invention will become apparent from the following detailed description of a preferred embodiment thereof, illustrated only by way of non-limitative example in the accompanying drawings, wherein:

FIGS. 3, 4 and 5 are respectively a side view, a front view and a perspective view of the carriage for removing the products;

FIG. 6 is a side view of the lifting unit; and

FIGS. 7, 8 and 9 are three views of three successive operating conditions of the lifting unit.

DESCRIPTION OF THE PREFERRED EMBODIMENTS

Figure 1:
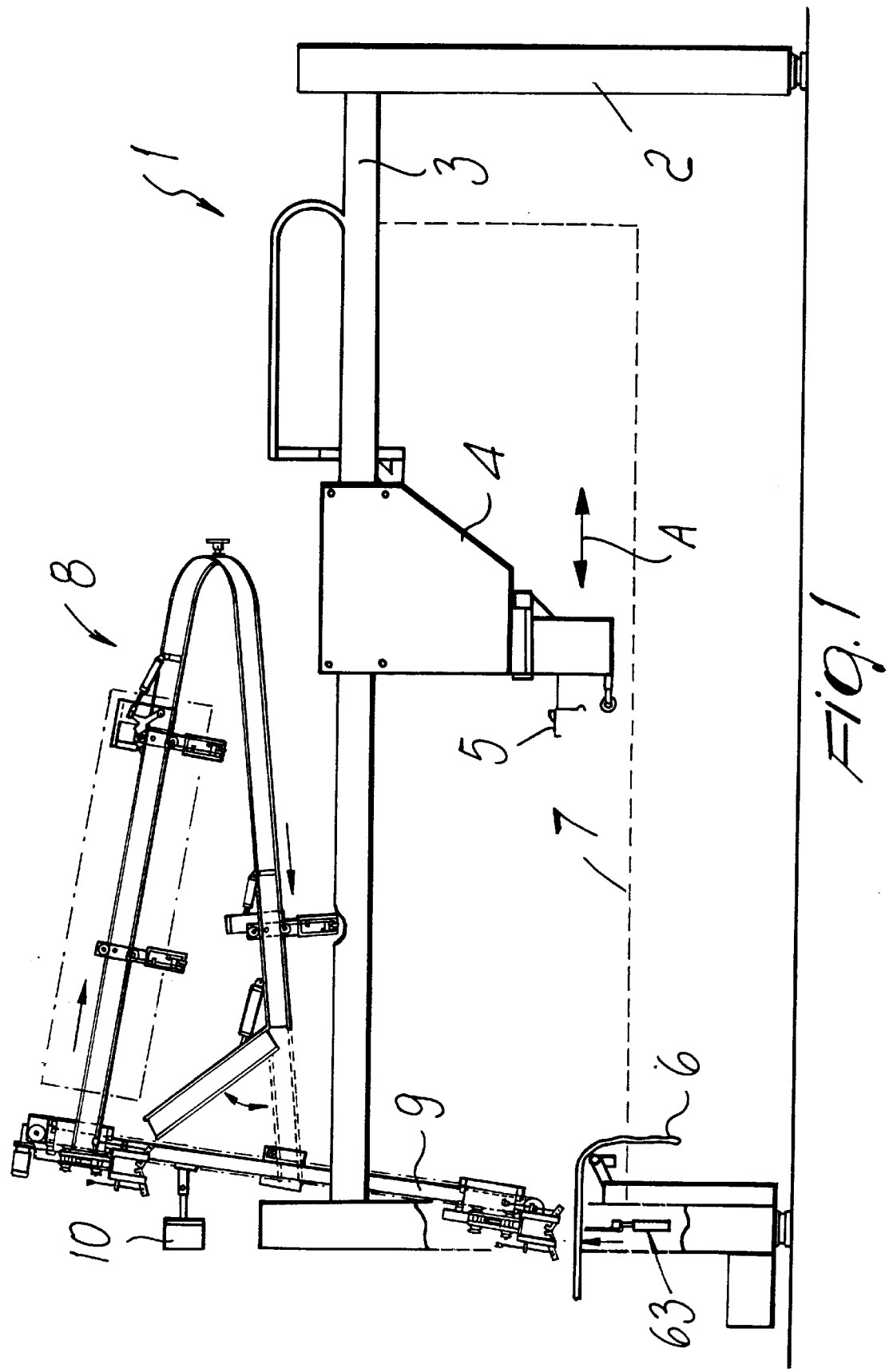
FIG. 1 is a side view of the apparatus, combined with a conventional device for removing a product from a quilting machine.
Figure 2:
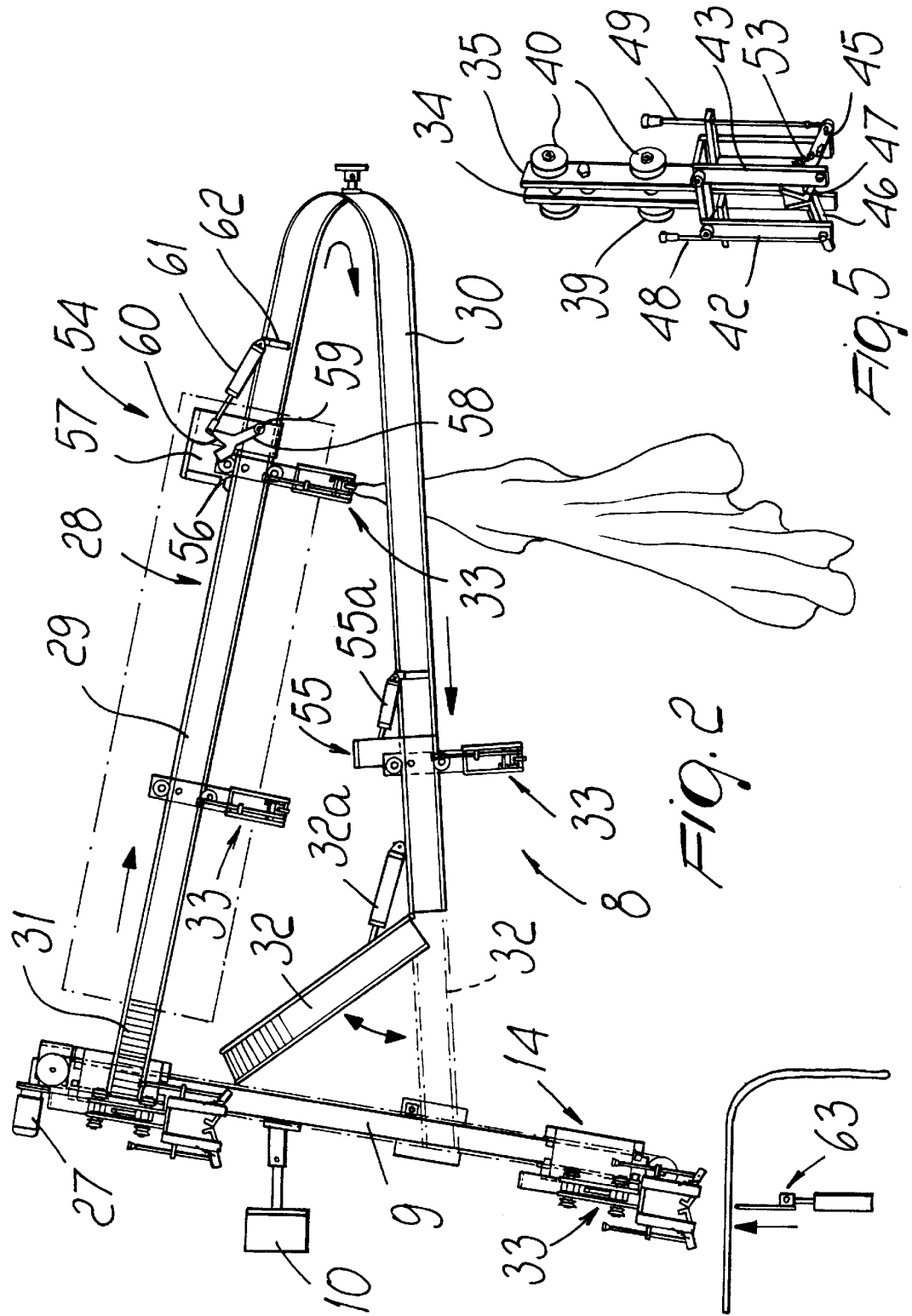
FIG. 2 is an enlarged-scale side view of the apparatus.

With reference to the above figures, the reference numeral 1 designates a frame composed of four posts 2 which are arranged as corners of a rectangle and are connected, at the top, by longitudinal beams 3 along which a truck 4 slides which supports clamps 5. The truck 4 is actuated with a back-and-forth motion in the direction A between an extended position and a retracted position. When the truck is in the extended position, the clamps 5 grip the product, for example a quilt 6, at the exit of a quilting machine (not shown), and through the subsequent stroke for the return of the truck to the retracted position, they transfer said product onto a surface 7 to perform additional cleaning and finishing operations.

If the quilting machine delivers additional quilts before the surface 7 is free, the apparatus according to the invention intervenes and allows to temporarily store the delivered quilts.

The apparatus is generally designated by the reference numeral 8 and comprises a substantially vertical post 9 supported by the frame 2 and 3 by means of arms 10.

A driving sprocket 11 and a driven sprocket 12 are rotatably supported at the opposite ends of the post 9 (see FIGS. 6–9). A chain 13 winds around the sprockets 11 and 12 and its opposite ends are connected to a slider 14 which can slide, by means of rollers 15, on the post 9.

The slider 14 is constituted by a plate whereto two inverted-U elements or hooks 16 and 17 are rigidly coupled at right angles. The hooks 16 and 17 are superimposed with respect to each other and lie on a plane which is perpendicular to the plane of arrangement of the chain 13.

An L-shaped element 18 is fixed to the top of the slider 14, and the cylinder 19 of a pneumatic jack 20 is articulated to said L-shaped element, said jack 20 protruding downwards and lying parallel to the chain 13. The jack 20 has a stem 21 whereat an arm 22 of a lever 23 is articulated, said lever 23 being pivoted in a rocker-like fashion to the slider 14. The lever 23 comprises a second arm 24 lying between the hooks 16 and 17. The reference numeral 25 designates a return spring interposed between the arm 22 and a coupling 26 which is rigidly coupled to the slider 14. The lever 23, under the actuation of the jack 20, performs alternating oscillations which allow the arm 24 to tilt upwards (FIG. 8) or to resume the lowered position (FIG. 9), as described in greater detail hereinafter.

The slider 14 acts as a lifting unit and is actuated along the post 9 by means of a gearmotor 27 which is fitted at the top of the post 9 and on the output shaft whereof the sprocket 11 is keyed. The gearmotor 27 is actuated so as to make the slider perform three different strokes: during a first stroke, the slider moves from the lower end to the top of the post, whereat it lies at the inlet of a guiding element 28. Then the slider 14 performs a descent stroke which is shorter than the upward stroke and at the end of which the slider stops at an intermediate level at the exit of the guiding element 28. Finally, the slider performs a third stroke, through which it descends further from said intermediate position to the lower end of the post.

The guiding element 28 is constituted in practice by a single rail having an I-shaped cross-section and an inclined path and comprising a first upper portion 29 and a lower portion 30 which are joined by a bend and lie longitudinally above the beams 3 of the frame. The upper portion 29 has an end part which forms a curved connecting element 31, whereby the path of the single rail 28 is diverted at right angles to the plane of the chain 13. Likewise, the end part of the lower portion 30 also forms a curved connecting element 32, whereby the path of the single rail is diverted at right angles to the plane of the chain 13. However, the connecting element 32, with respect to the connecting element 31, is articulated to the remaining portion of the single rail and can be raised and lowered by means of a lateral jack 32a wherein the cylinder is articulated to the single rail and the stem is articulated to the connecting element 32.

Figure 3:
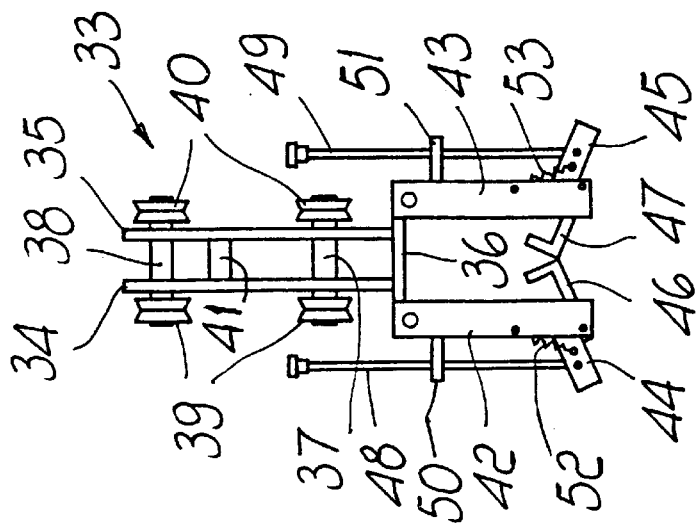
Figure 4:
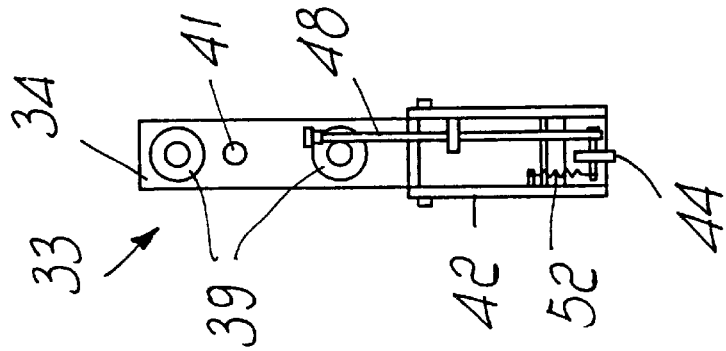
Figure 9:
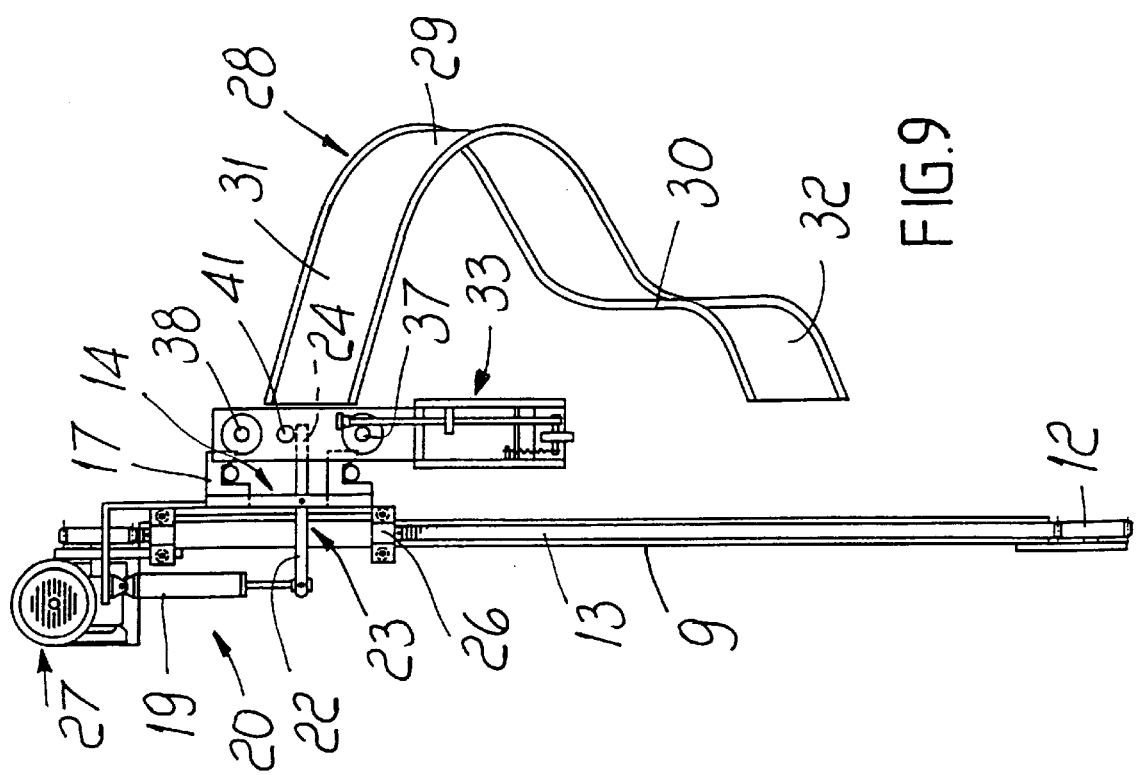

A plurality of carriages 33, one whereof is illustrated in FIGS. 3–5, are adapted to slide on the guiding element 28.

The carriage 33 comprises a frame composed of two plates 34 and 35 which are flat and parallel and protrude from a cross-member 36. Two axles 37 and 38 lie one above the other between the plates 34 and 35, protrude outwards and support two pairs of rollers 39 and 40. The rollers of each pair have a peripheral groove and are spaced so as to allow rolling engagement on the upper and lower edges of the single rail 28.

A pin 41 constituting a third axle is interposed between the axles 37 and 38 and its opposite ends are rigidly coupled to the plates 34 and 35. Two brackets 42 and 43 protrude downwards from the cross-member 36, and two levers 44 and 45 are articulated between their wings; said levers oscillate on the same plane and have two arms 46 and 47 protruding into the region between the brackets 42 and 43 and forming the jaws of a sort of clamp for gripping a product at the exit of a quilting machine.

Two respective rods 48 and 49 are articulated to the ends of the levers 44 and 45, are parallel to each other, and are guided in lugs 50 and 51 which are rigidly coupled to the brackets 42 and 43.

Traction springs 52 and 53 act between the levers 44 and 45 and the brackets 42 and 43 and keep the rods raised up to a level which is preset by the mutual abutment of the jaws 46 and 47 of the clamp.

The described apparatus is completed by two devices 54 and 55 arranged along the upper portion 29 and the lower portion 28 of the single rail and meant respectively to stop and release the carriages 33 individually.

The device 54 comprises a stop element 56 which is supported by an L-shaped element 57 fixed to the single rail 28 and movable between a lowered position for engaging the carriage and a raised position for releasing said carriage, and also comprises an actuator adapted to act on the rods 48 and 49 to produce the opening of the clamp 46 and 47.

The actuator is composed of a lever 58 articulated at 59 to the L-shaped element 57 and provided with an extension 60 whereto the stem of a pneumatic jack 61 is articulately connected, the cylinder of said jack being rigidly coupled to a support 62 so that it does not interfere with the advancement of the carriage. The extension 60 is also connected by a lever system (not shown in the drawing but easily imaginable) to the lever 58, so that its movement from the carriage stop position to the carriage release position occurs simultaneously with the opening of the clamp 46 and 47. The device 55 comprises a stop element which is similar to the one designated above by the reference numeral 56, against which the carriages released by the device 55 accumulate; said stop element is actuated by a jack 55a so as to release one carriage at a time towards the connecting element 32.

Operation of the described apparatus is described hereafter, assuming an initial condition wherein the slider 14 is at the lower end of the post 9 and the carriage 33 is locked on the slider above the product 6. The carriage 33 is locked on the slider by the lifting of the arm 24 of the lever 23 performed by the jack 20, which causes the axles 37 and 38 to engage the hooks 16 and 17.

In this condition, by means of a lifting blade 63, the product 6 is lifted from its supporting surface and inserted between the jaws 46 and 47 of the clamp, which retain it even when the blade 63 is lowered again below the supporting surface.

As soon as the blade 63 has disengaged from the clamp, the gearmotor 27 is activated and, by means of the chain 13, it lifts the slider 14 to a level whereat the carriage 33 is at the inlet of the connecting element 31 of the upper portion 29. During the upward stroke of the slider, the connecting element 32 is in the raised position so as to avoid interfering with the carriage 33.

When the slider 14 has reached the upper end of its stroke, the jack 20 is activated so as to lower the arm 24 of the lever 23 and allow the carriage 33 to descend along the connecting element 31 and travel by gravity along the portion 29 of the single rail 28 until it abuts against the stop element 56. By actuating the jack 61, the lever 58 acts on a rod 48 or 49 that rotates the corresponding jaw 46 or 47, causing the disengagement of the product 6 towards the user.

Release of the product 6 is followed by the actuation of the stop element 56 in the position for releasing the carriage 33, which can descend along the remaining portion 30 of the single rail and stop against the stop element of the device 55. Meanwhile, the connecting element 32 is lowered so that it aligns with the portion 30 and the slider 14 is lowered from the upper stroke limit position to the level whereat it is aligned with the connecting element 32.

By releasing the device 55, the carriage 33 descends along the connecting element 32, at the end whereof it finds the slider 14, which is ready to receive it. The carriage is transferred onto the slider by the lever 23, the arm 24 whereof engages below the pin 41 so that the carriage 33 first descends against the plate 14 and is then raised to engage the hooks 16 and 17 by means of the axles 37 and 38.

Once locking of the carriage 33 on the slider 14 has been completed, said slider, by actuating the chain 13, is lowered to the lower stroke limit, in the position for engaging a new item. The described cycle can then repeat in the above-described manner.

It should be noted that when each cycle is completed, the carriage turns around through 180 so that the rollers 39 and 40 are used alternately to follow the path along the single rail 28.

A plurality of carriages 33 are of course used; after removing the product and releasing it by means of the device 54, said carriages are accumulated against the device 55 and are then individually released as required.

The described invention is susceptible of numerous modifications and variations, all of which are within the scope of the same inventive concept.

The structure and the dimensions may also vary according to requirements.

What is claimed is:

1. An apparatus for temporarily storing products, such as for storing products at an exit side of a quilting machine, the apparatus comprising:

a lifting unit being actuatable between a lower, an intermediate, and an upper position;

a guiding element extending along an inclined path and including an upper and a lower portion thereof;

at least one carriage being slidable under the effect of gravity along said guiding element, said at least one carriage having a gripping element for gripping a product to be stored;

a first stop element arranged at said upper portion of said guiding element for stopping said at least one carriage at a storage location on said guiding element upper portion;

release actuation means, provided at said first stop element, for actuating said gripping element at said storage location for releasing a stored product;

a second stop element, located at said lower portion of said guiding element, for stopping said at least one carriage sliding on said guiding element lower portion after releasing said stored product;

retaining and releasing means, provided at said lifting unit, for retaining said at least one carriage at said lifting unit, and releasing said at least one carriage from said lifting unit; and wherein said lifting unit is movable between said intermediate position, in which said at least one carriage is received from said lower portion of said guiding element and retained by said retaining means, said lower position being a position in which said retained carriage receives a product from the quilting machine, and said upper position being a position in which said carriage with the product received from the quilting machine is released by said retaining and releasing means at said upper portion of said guiding element, said retaining and releasing means comprising two hook-shaped elements, said hook-shaped elements being located one above the other; a lever, pivoted in a rocker-like manner on a slider of said lifting unit and having a first arm and a second arm protruding between said hook-shaped elements; and an actuation jack for acting on said first arm, said carriages having means for being engaged by said second arm and moved into locking engagement with said hook-shaped elements.

2. An apparatus according to claim 1, wherein said lifting unit comprises: a substantially vertical post; two sprockets supported at opposite ends of said post; a gearmotor for actuating one of said sprockets; a chain winding around said sprockets; said slider being fixed to said chain and provided with said retaining and releasing means for retaining and releasing said carriage.

3. An apparatus according to claim 2, wherein said carriage has a frame, said frame comprising: two flat and parallel plates; two axles lying between said plates at a distance being the same as the distance between said hook-shaped elements; and a third axle being interposed between said two axles and adapted to be engaged by said second arm.

4. An apparatus according to claim 3, wherein said guiding element is constituted by a single rail, said carriage having, on each outer side of said plates, two rollers, said rollers having a peripheral groove and being spaced so as to allow rolling engagement on upper and lower edges of said single rail guiding element.

5. An apparatus according to claim 4, wherein said element for gripping the stored product comprises: two levers, said levers being pivoted in a rocker-like manner in said frame of the carriage for oscillating on a same plane, said levers having two first arms which form a clamp, said clamp being adapted to grip a product to be stored; actuation rods, and two second arms, said second arms being articulately connected to said actuation rods which are actutable by said release device to produce opening of said clamp.

6. An apparatus according to claim 1, wherein the lower portion of said guiding element comprises a connecting element, and a raise actuator, said connecting element being raised by said raise actuator to allow passage of said at least one carriage during upward movement of the lifting unit.

* * * * *